(12) United States Patent
Saito

(10) Patent No.: US 11,336,783 B2
(45) Date of Patent: May 17, 2022

(54) INFORMATION PROCESSING APPARATUS AND NON-TRANSITORY COMPUTER READABLE MEDIUM FOR CONTROLLING OPERATION SCREEN

(71) Applicant: FUJIFILM Business Innovation Corp., Tokyo (JP)

(72) Inventor: Tomoaki Saito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 170 days.

(21) Appl. No.: 16/505,679

(22) Filed: Jul. 8, 2019

(65) Prior Publication Data
US 2020/0028983 A1  Jan. 23, 2020

(30) Foreign Application Priority Data

Jul. 19, 2018  (JP) .............................. JP2018-135700

(51) Int. Cl.
*H04N 1/00* (2006.01)
*H04N 1/44* (2006.01)
(52) U.S. Cl.
CPC ..... *H04N 1/00474* (2013.01); *H04N 1/00344* (2013.01); *H04N 1/00925* (2013.01); *H04N 1/4433* (2013.01)
(58) Field of Classification Search
None
See application file for complete search history.

(56) References Cited

U.S. PATENT DOCUMENTS

| 10,469,674 | B1 * | 11/2019 | Fukushima | ........ H04N 1/00233 |
| 2006/0290680 | A1 * | 12/2006 | Tanaka | ............... H04N 1/32523 345/173 |

(Continued)

FOREIGN PATENT DOCUMENTS

| JP | 2005321944 | 11/2005 |
| JP | 2012048442 | 3/2012 |
| JP | 2014073632 | 4/2014 |

OTHER PUBLICATIONS

"Office Action of Japan Counterpart Application", dated Mar. 29, 2022, with English translation thereof, p. 1-p. 6.

*Primary Examiner* — Henok Shiferaw
(74) *Attorney, Agent, or Firm* — JCIPRNET

(57) ABSTRACT

An image forming apparatus includes a first controller, a selection section, and a second controller. The first controller performs control in which a second operation screen is displayed on a terminal apparatus that is connected to the image forming apparatus in a manner communication is possible, the second operation screen being generated on the basis of a first operation screen of the image forming apparatus. The selection section selects either one of a first mode and a second mode, the first mode being a mode in which an operation from the first operation screen is acceptable, the second mode being a mode in which remote control from the second operation screen is acceptable. The second controller performs control in which, if the second mode is selected by the selection section, a display state of the second operation screen is prohibited from being changed in accordance with an operation occurred in the image forming apparatus other than an operation from the second operation screen.

17 Claims, 11 Drawing Sheets

(56) References Cited

U.S. PATENT DOCUMENTS

| | | | |
|---|---|---|---|
| 2013/0235414 A1* | 9/2013 | Iwamoto | G06K 15/4005 358/1.14 |
| 2015/0341441 A1* | 11/2015 | Saitoh | H04N 1/00127 709/208 |
| 2016/0070510 A1* | 3/2016 | Iwase | G06F 3/1238 358/1.14 |
| 2016/0105572 A1* | 4/2016 | Mutsuno | H04N 1/00204 358/1.15 |
| 2017/0264760 A1* | 9/2017 | Sato | H04N 1/00408 |
| 2017/0280003 A1* | 9/2017 | Haba | H04L 63/0492 |
| 2018/0097949 A1* | 4/2018 | Mochizuki | H04N 1/00506 |
| 2019/0342464 A1* | 11/2019 | Kawamura | H04N 1/00925 |

* cited by examiner

INFORMATION PROCESSING APPARATUS AND NON-TRANSITORY COMPUTER READABLE MEDIUM FOR CONTROLLING OPERATION SCREEN

CROSS-REFERENCE TO RELATED APPLICATIONS

This application is based on and claims priority under 35 USC 119 from Japanese Patent Application No. 2018-135700 filed Jul. 19, 2018.

BACKGROUND

(i) Technical Field

The present disclosure relates to an image forming apparatus and a non-transitory computer readable medium.

(ii) Related Art

For example, Japanese Unexamined Patent Application Publication No. 2012-48442 describes an image forming apparatus that causes a display screen displayed on display means to be shared between terminals connected to each other via a network. The image forming apparatus includes storage means, shared screen generating means, and display screen data transmitting means. The storage means stores non-display specification information that specifies, for each piece of display data to be displayed within a display screen, whether the display data is to be displayed or not to be displayed on the terminals. The shared screen generating means generates display screen data that is to be displayed in a shared manner on the display means and the terminals. The display screen data transmitting means transmits the generated display screen data to the display means and the terminals. When generating display screen data including non-display data, which is display data specified not to be displayed according to the non-display specification information, the shared screen generating means generates first display screen data including non-display data and second display screen data not including non-display data. The display screen data transmitting means transmits the first display screen data to the display means and transmits the second display screen data to the terminals.

Some image forming apparatuses include a function for enabling remote control from a terminal apparatus such as a personal computer (PC). If a certain operation occurs in the image forming apparatus other than an operation from an operation screen of the terminal apparatus during remote control from the terminal apparatus, the display state of an operation screen of the image forming apparatus and the operation screen of the terminal apparatus may be changed. In this case, for example, the change in the display state of the operation screen of the terminal apparatus undesirably interrupts an operator's explanation particularly when the operator who uses the terminal apparatus explains an operation method for a user of the image forming apparatus by using the operation screen of the terminal apparatus and the operation screen of the image forming apparatus in customer support of the image forming apparatus, for example.

SUMMARY

Aspects of non-limiting embodiments of the present disclosure relate to an image forming apparatus and a non-transitory computer readable medium that prevent the display state of the operation screen of the terminal apparatus from being changed when an operation occurs in the image forming apparatus other than an operation from the operation screen of the terminal apparatus during remote control of the image forming apparatus from the operation screen of the terminal apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a first controller, a selection section, and a second controller. The first controller performs control in which a second operation screen is displayed on a terminal apparatus that is connected to the image forming apparatus in a manner communication is possible, the second operation screen being generated on the basis of a first operation screen of the image forming apparatus. The selection section selects either one of a first mode and a second mode, the first mode being a mode in which an operation from the first operation screen is acceptable, the second mode being a mode in which remote control from the second operation screen is acceptable. The second controller performs control in which, if the second mode is selected by the selection section, a display state of the second operation screen is prohibited from being changed in accordance with an operation occurred in the image forming apparatus other than an operation from the second operation screen.

BRIEF DESCRIPTION OF THE DRAWINGS

Exemplary embodiments of the present disclosure will be described in detail based on the following figures, wherein.

DETAILED DESCRIPTION

Now, exemplary embodiments for implementing the present disclosure will be described in detail with reference to the drawings.

First Exemplary Embodiment

Figure 1:
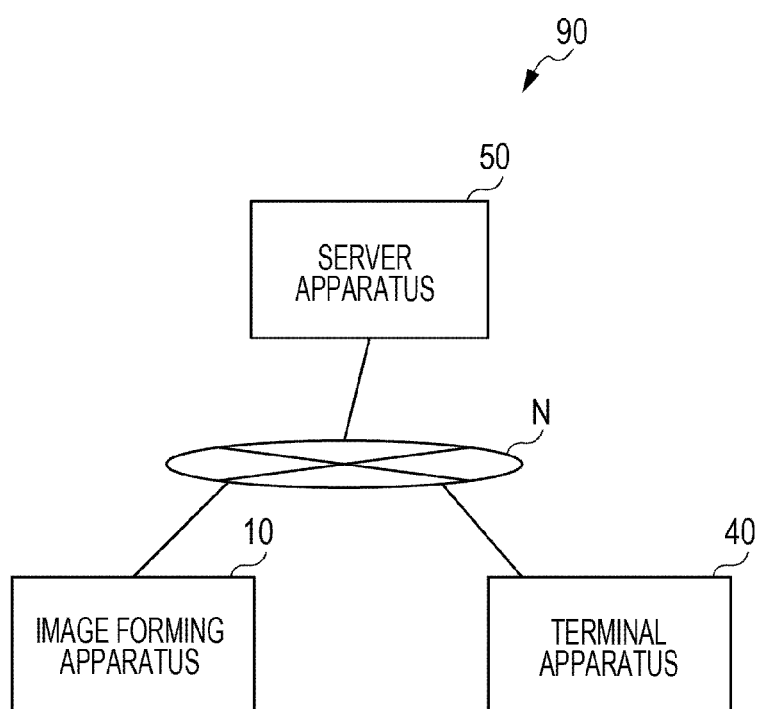
FIG. 1 illustrates an exemplary configuration of an image forming system according to a first exemplary embodiment.

FIG. 1 illustrates an exemplary configuration of an image forming system 90 according to a first exemplary embodiment.

As illustrated in FIG. 1, the image forming system 90 according to this exemplary embodiment includes an image forming apparatus 10 to be used by a user, a terminal apparatus 40 to be used by an operator, and an external server apparatus 50.

The image forming apparatus 10 according to this exemplary embodiment is mutually connected to each of the terminal apparatus 40 and the server apparatus 50 via a network N. Note that the network N is, for example, the Internet, a local area network (LAN), a wide area network (WAN), or the like.

The terminal apparatus 40 is, for example, a personal computer (PC), a tablet terminal, or the like. The server apparatus 50 is, for example, a server computer, a general-purpose computer such as a personal computer (PC), or the like.

This exemplary embodiment will describe a case where the user of the image forming apparatus 10 uses customer support of the image forming apparatus 10 in order to receive explanation of the functions of the image forming apparatus 10. Specifically, the terminal apparatus 40 is installed in a customer support center, and the operator gives the user of the image forming apparatus 10 the explanation of the functions while performing remote control of the image forming apparatus 10 from the terminal apparatus 40. This remote control function is called "remote assistance" in this exemplary embodiment.

Next, "remote assistance" of the image forming apparatus 10 will be described with reference to FIGS. 2 and 3.

Figure 2:
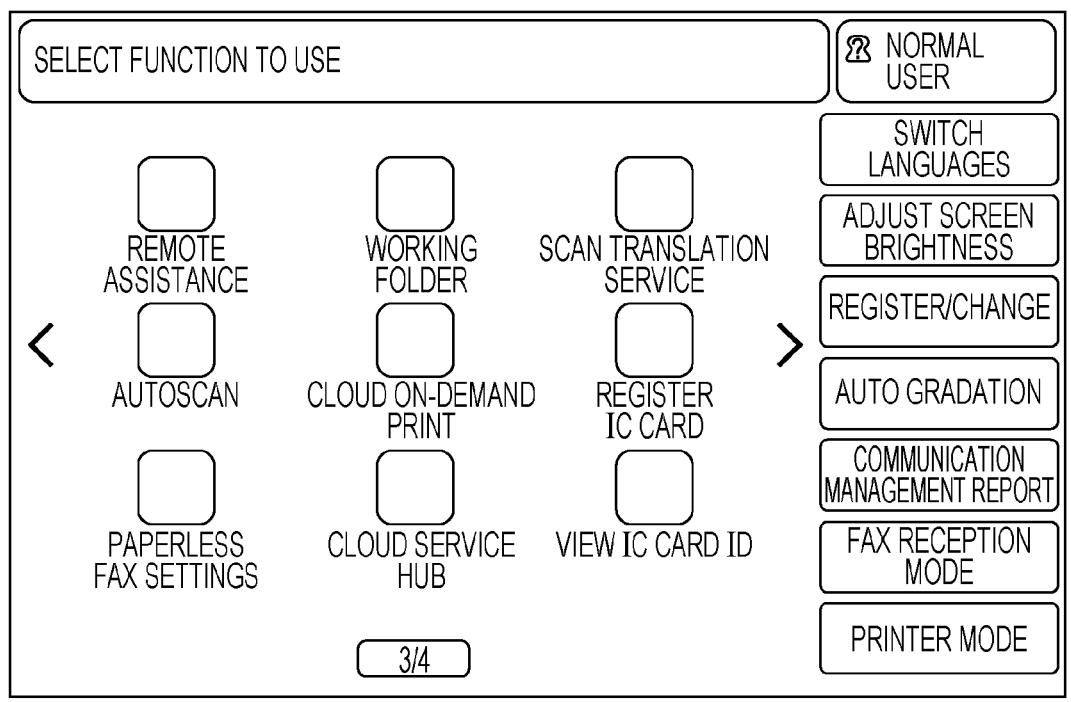
FIG. 2 is a front view of an exemplary home screen of an image forming apparatus according to the first exemplary embodiment.

FIG. 2 is a front view of an exemplary home screen of the image forming apparatus 10 according to this exemplary embodiment.

As illustrated in FIG. 2, the image forming apparatus 10 according to this exemplary embodiment displays a home screen including a "remote assistance" button (icon).

When the user of the image forming apparatus 10 presses the "remote assistance" button, the image forming apparatus 10 is connected to the external server apparatus 50 via the network N. The server apparatus 50 automatically generates a reception number for remote connection with the terminal apparatus 40 and transmits the generated reception number to the image forming apparatus 10 via the network N.

Figure 3:
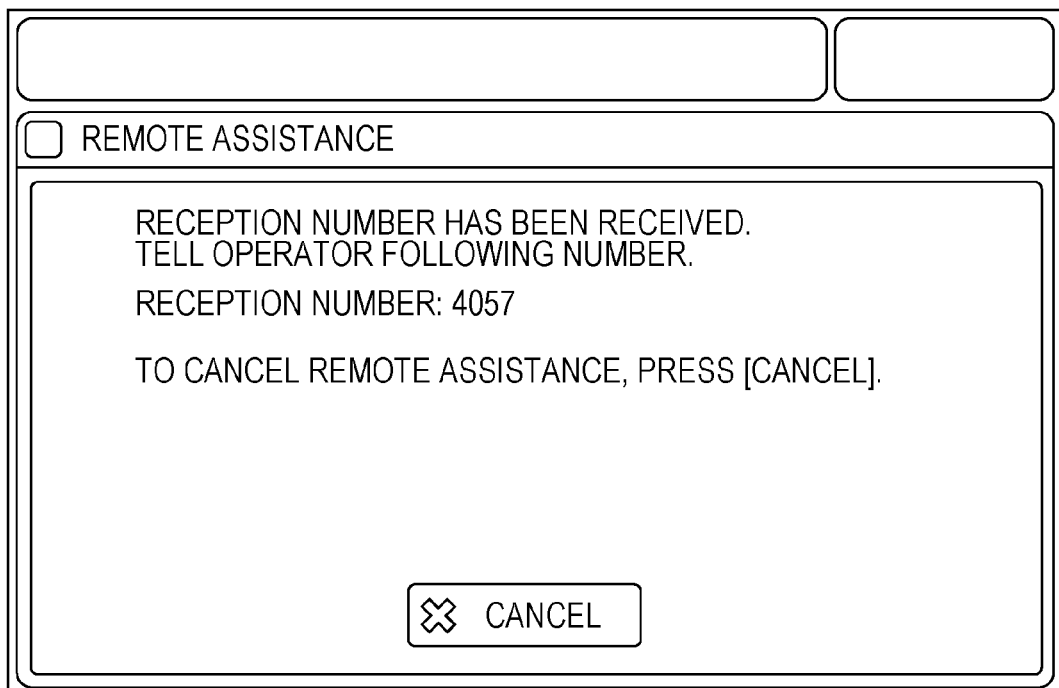
FIG. 3 is a front view of an exemplary reception-number display screen of the image forming apparatus according to the first exemplary embodiment.

FIG. 3 is a front view of an exemplary reception-number display screen of the image forming apparatus 10 according to this exemplary embodiment.

As illustrated in FIG. 3, the image forming apparatus 10 according to this exemplary embodiment displays the reception number ("4057" in this exemplary embodiment) received from the server apparatus 50 on the reception-number display screen.

The user sees the reception-number display screen illustrated in FIG. 3 and then informs the operator of the terminal apparatus 40 of the reception number "4057". The informing method is a phone call, email, or the like. The informed operator inputs the reception number "4057" to the terminal apparatus 40. This input allows remote connection of the terminal apparatus 40 to the image forming apparatus 10 via the network N. Upon establishment of the remote connection, in accordance with a predetermined operation procedure, an operation screen of the image forming apparatus 10 is transferred to the terminal apparatus 40, and the same operation screen is displayed on the terminal apparatus 40, for example. That is, the same operation screen is shared between the image forming apparatus 10 and the terminal apparatus 40.

In a state where the operation screen is shared in the above manner, operation on either one of the operation screen of the image forming apparatus 10 and the operation screen of the terminal apparatus 40 is valid, and operation on the other operation screen is invalid. The valid operation screen may be specified by either one of the image forming apparatus 10 and the terminal apparatus 40.

Next, an electric configuration of the image forming apparatus 10 according to the first exemplary embodiment will be described with reference to FIG. 4.

Figure 4:
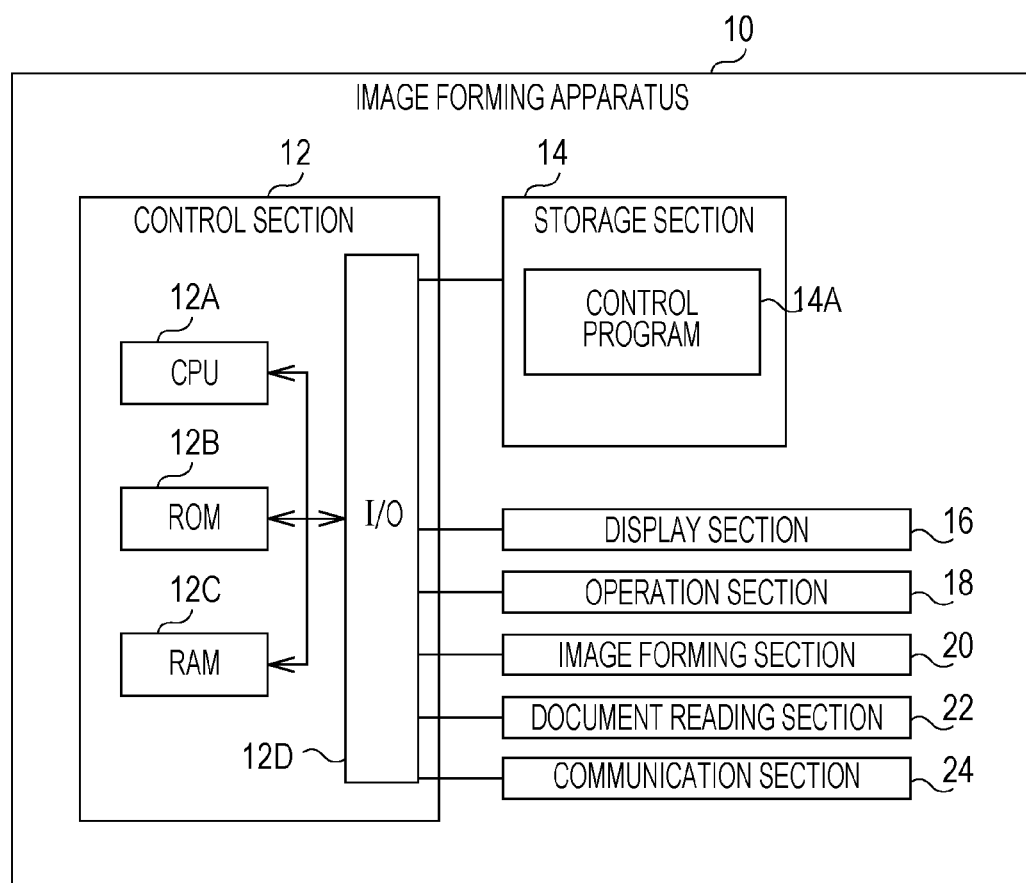
FIG. 4 is a block diagram illustrating an exemplary electric configuration of the image forming apparatus according to the first exemplary embodiment.

FIG. 4 is a block diagram illustrating an exemplary electric configuration of the image forming apparatus 10 according to the first exemplary embodiment.

As illustrated in FIG. 4, the image forming apparatus 10 according to this exemplary embodiment includes a control section 12, a storage section 14, a display section 16, an operation section 18, an image forming section 20, a document reading section 22, and a communication section 24.

The control section 12 includes a central processing unit (CPU) 12A, a read only memory (ROM) 12B, a random access memory (RAM) 12C, and an input/output interface (I/O) 12D. These units are connected to one another via a bus.

The I/O 12D is connected to functional sections including the storage section 14, the display section 16, the operation section 18, the image forming section 20, the document reading section 22, and the communication section 24. These functional sections are capable of mutually communicating with the CPU 12A through the I/O 12D.

The control section 12 may be configured as a sub-control section that controls part of operation of the image forming apparatus 10 or part of a main control section that controls the entire operation of the image forming apparatus 10. Some or all of blocks of the control section 12 are, for example, an integrated circuit such as a large scale integration (LSI) or an integrated circuit (IC) chip set. An individual circuit may be used for each of the blocks, or a circuit in which some or all of the blocks are integrated may be used. The blocks may be integrated, or one or more blocks may be separately provided. In addition, part of each of the blocks may be separately provided. The control section 12 may be integrated in the form of, in addition to the LSI, a dedicated circuit or a general-purpose processor.

Examples of the storage section 14 include a hard disk drive (HDD), a solid state drive (SSD), and a flash memory. A control program 14A for realizing the remote operation function according to this exemplary embodiment is stored in the storage section 14. Note that the control program 14A may also be stored in the ROM 12B.

The control program 14A may be, for example, installed in the image forming apparatus 10 in advance. The control program 14A may be stored in a non-volatile storage medium, or may be distributed via a network, to be installed in the image forming apparatus 10 as appropriate. Note that examples of the non-volatile storage medium include a compact disc read only memory (CD-ROM), a magneto-optical disk, an HDD, a digital versatile disc read only memory (DVD-ROM), a flash memory, a memory card, and the like.

For example, a liquid crystal display (LCD), an organic electroluminescent (EL) display, or the like is used for the display section 16. The display section 16 and a touch panel are integrated as a single unit. The operation section 18 is provided with various operation keys such as a ten key pad and a start key. The display section 16 and the operation section 18 receive various instructions from the user of the image forming apparatus 10. Examples of the various instructions include an instruction for starting to read a document, an instruction for starting to copy a document, and the like. The display section 16 displays various kinds of information such as a result of processing performed in accordance with an instruction received from the user and a notification for the processing.

The image forming apparatus 10 is provided with an automatic document feeder, which is omitted from illustration, in an upper part of the image forming apparatus 10. The document reading section 22 receives sheets of a document placed on a feeder tray of the automatic document feeder one by one and optically scans the received sheets, thereby obtaining image information. Alternatively, the document reading section 22 optically scans a document placed on a document plate, such as a platen glass, thereby obtaining image information.

The image forming section 20 forms an image on a recording medium such as paper on the basis of the image information obtained through scanning by the document reading section 22 or image information obtained by, for example, an external PC connected via the network N. Although this exemplary embodiment describes an electrophotographic system as an example of a system for forming an image, another system such as an inkjet system may also be employed.

If the system for forming an image is the electrophotographic system, the image forming section 20 includes a photoconductor drum, a charging unit, an exposure unit, a development unit, a transfer unit, and a fixing unit. The charging unit applies a voltage to the photoconductor drum in order to cause the surface of the photoconductor drum to be charged. The exposure unit performs exposure on the photoconductor drum, which is charged by the charging unit, with light in accordance with image information, thereby forming an electrostatic latent image on the photoconductor drum. The development unit develops, with toner, the electrostatic latent image formed on the photoconductor drum, thereby forming a toner image on the photoconductor drum. The transfer unit transfers the toner image formed on the photoconductor drum onto a recording medium. The fixing unit fixes the toner image transferred on the recording medium by heating under pressure.

The communication section 24 is connected to the network N such as the Internet, a LAN, or a WAN so as to be capable of communicating with an external PC or the like via the network N.

In a case of using, for example, the above-described "remote assistance" of the image forming apparatus 10 according to this exemplary embodiment, if a certain operation occurs in the image forming apparatus 10 other than an operation from the operation screen of the terminal apparatus 40 during remote control from the terminal apparatus 40, the display state of the operation screen of the image forming apparatus 10 and the operation screen of the terminal apparatus 40 may be changed. This undesirably interrupts the operator's explanation.

That is, in the above "remote assistance", the content of operation by the operator on the operation screen of the terminal apparatus 40 is reflected on the operation screen of the image forming apparatus 10. By operating the operation screen of the terminal apparatus 40, the operator explains the content of operation to the user of the image forming apparatus 10. For example, if the user wishes to understand detailed setting in the execution of copying, the operator selects "copy" on a menu screen, which is an exemplary operation screen, and explains settings of "color mode", "sheet size", and the like while transitioning the screens. Since the user's touches on the operation screen of the image forming apparatus 10 are invalid during the explanation, the display content does not change and the operator is not affected.

However, if, for example, the user opens the front cover in front of the toner cartridge or pulls out the sheet tray of the image forming apparatus 10 in which sheets are set, warning information is displayed on the operation screen of the image forming apparatus 10, which is reflected on the operation screen of the terminal apparatus 40. Such an operation during the operator's remote control changes display of the operation screen of the terminal apparatus 40 against the operator's intention, and the operator's explanation of the operation method or the like is unfortunately interrupted. It is troublesome for the operator to start over the explanation.

Figure 5:
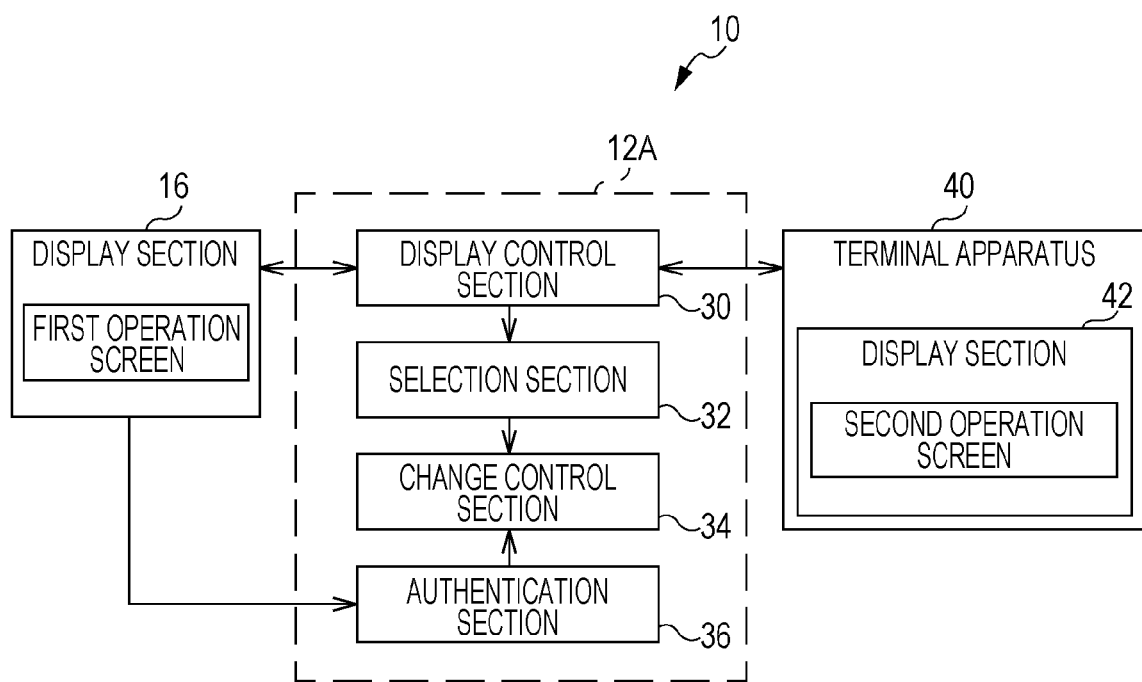
FIG. 5 is a block diagram illustrating an exemplary functional configuration of the image forming apparatus according to the first exemplary embodiment.

Accordingly, the CPU 12A of the image forming apparatus 10 according to this exemplary embodiment loads and executes the control program 14A stored in the storage section 14 to the RAM 12C so as to serve as each of the sections illustrated in FIG. 5.

FIG. 5 is a block diagram illustrating an exemplary functional configuration of the image forming apparatus 10 according to the first exemplary embodiment.

As illustrated in FIG. 5, the CPU 12A of the image forming apparatus 10 according to this exemplary embodiment serves as a display control section 30, a selection section 32, a change control section 34, and an authentication section 36. Note that the display control section 30 is an example of a first controller, and the change control section 34 is an example of a second controller. The display control section 30 and the change control section 34 may be realized as a single control section.

The display control section 30 according to this exemplary embodiment performs control in which a second operation screen is displayed on a display section 42 of the terminal apparatus 40, which is connected to the image forming apparatus 10 in a manner communication is possible, the second operation screen being generated on the basis of a first operation screen of the image forming apparatus 10. Note that the display content of the second operation screen may be the same as the display content of the first operation screen or may be partly different from the display content of the first operation screen.

The selection section 32 according to this exemplary embodiment selects either one of a first mode and a second mode. An operation from the first operation screen is acceptable in the first mode, whereas remote control from the second operation screen is acceptable in the second mode. The first mode is a mode in which the user of the image forming apparatus 10 is allowed to perform operations and is also called a user mode. The second mode, on the other hand, is a mode in which the operator of the terminal apparatus 40 performs remote control of the image forming apparatus 10 and is also called an operator mode.

In the second mode, when the operator performs an operation (e.g., a scrolling operation or a button pressing operation) on the second operation screen of the terminal apparatus 40 to execute the above "remote assistance", this operation is reflected on the first operation screen of the image forming apparatus 10. In the second mode, any operation from the first operation screen of the image forming apparatus 10 is invalid, and the user's touches on the first operation screen cause no operation to occur. For selecting any of these modes, the user may give a selection instruction through the image forming apparatus 10, or the operator may give a selection instruction through the terminal apparatus 40.

If the second mode is selected by the selection section 32, the change control section 34 according to this exemplary embodiment performs control in which the display state of the second operation screen is prohibited from being changed in accordance with an operation occurred in the image forming apparatus 10 other than an operation from the second operation screen. Examples of the operation occurred in the image forming apparatus 10 include an operation of opening the front cover of the image forming apparatus 10, an operation of pulling out the sheet tray, an automatic reset operation, and an operation of receiving a setting change from an external PC or the like. Note that if the second mode is selected by the selection section 32, the change control section 34 may further perform control in which the display state of the first operation screen is prohibited from being changed in accordance with the operation occurred in the image forming apparatus 10 other than an operation from the second operation screen.

Hereinafter, this exemplary embodiment will describe a case of performing control in which the display state of each of the first operation screen and the second operation screen is prohibited from being changed. However, only the display state of the second operation screen may be prohibited from being changed.

Specifically, if the second mode is selected by the selection section 32, the change control section 34 performs control in which information in accordance with the operation occurred in the image forming apparatus 10 other than an operation from the second operation screen is hidden from display on each of the first operation screen and the second operation screen, for example. In the related art, for example, in a case of an operation of pulling out the sheet tray in the second mode, a warning message such as "sheet tray is open!" is displayed on the first operation screen and the second operation screen. In contrast, in this exemplary embodiment, even in a case of an operation of pulling out the sheet tray in the second mode, a warning message in accordance with this operation is displayed on neither of the first operation screen and the second operation screen.

According to this exemplary embodiment, as described above, information that is to be displayed in the related art is hidden from display. Thus, there is a possibility that the user does not sufficiently understand the operation state of the image forming apparatus 10 and that the operator does not sufficiently understand the operation state of the terminal apparatus 40. Accordingly, if the second mode is selected by the selection section 32 and no operation from the second operation screen is received for a predetermined period or longer, the change control section 34 may perform control in which the information that has been hidden from display is displayed. The information that has been hidden from display is, for example, the above warning message such as "sheet tray is open!". In addition, if the second mode is changed to the first mode by the selection section 32, the change control section 34 may perform control in which the information that has been hidden from display is displayed.

The authentication section 36 according to this exemplary embodiment authenticates the user of the image forming apparatus 10. Specifically, the authentication section 36 authenticates the user of the image forming apparatus 10 by using a user identifier (ID) and a password that are input through an authentication screen or the like of the image forming apparatus 10.

Next, operations of the image forming apparatus 10 according to the first exemplary embodiment will be described with reference to FIGS. 6 and 7.

Figure 6:
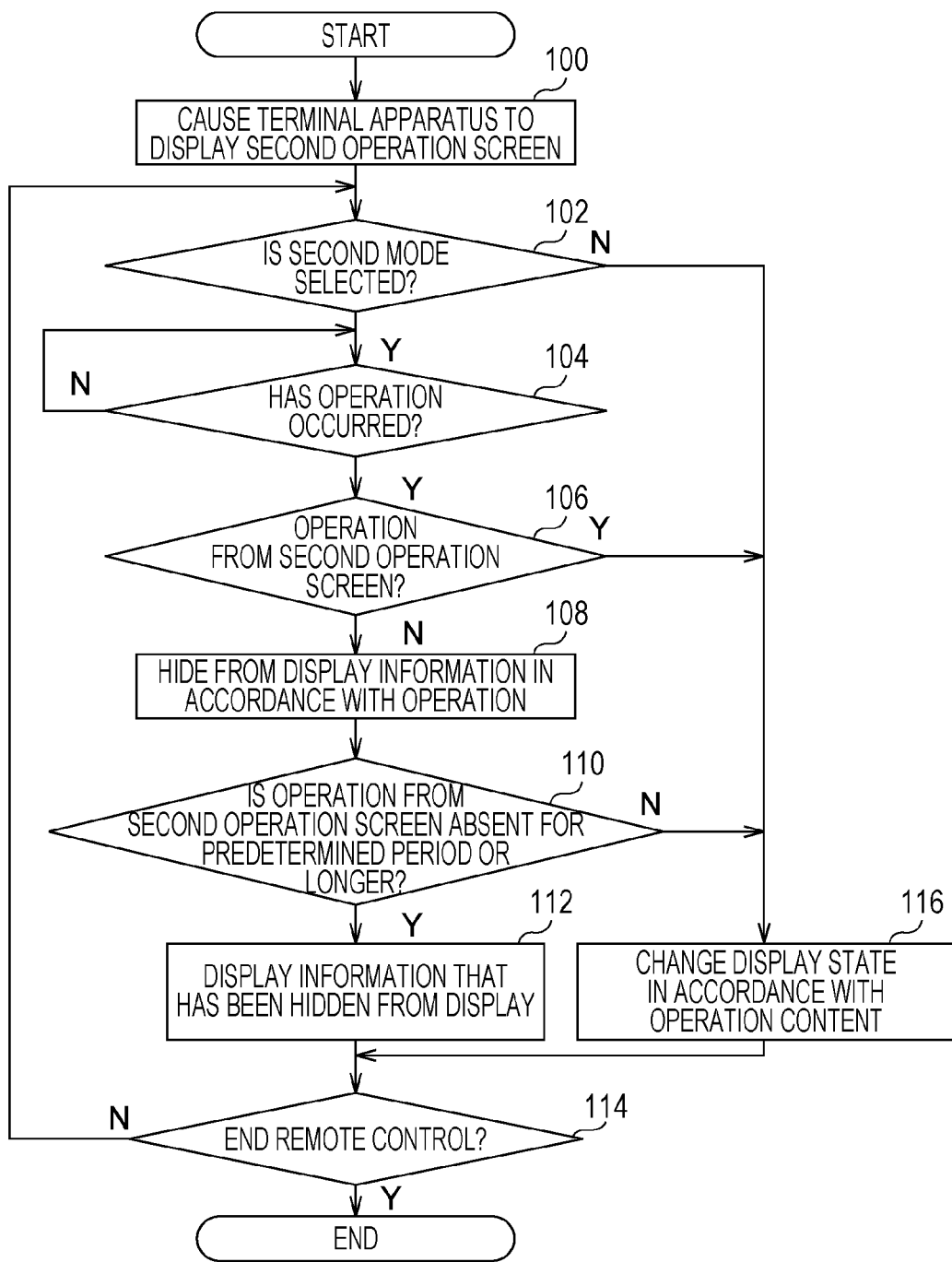
FIG. 6 is a flowchart illustrating exemplary flow of a process in accordance with a control program according to the first exemplary embodiment.

FIG. 6 is a flowchart illustrating exemplary flow of a process in accordance with the control program 14A according to the first exemplary embodiment.

In the exemplary flow illustrated in FIG. 6, the following case will be described: a case of performing control in which information that has been hidden from display is displayed if the second mode is selected and no operation from the second operation screen is received for a predetermined period or longer.

First, in response to an instruction for executing "remote assistance" described above with reference to FIGS. 2 and 3, the control program 14A is started, and the following steps are performed. Note that this exemplary embodiment will describe a case where "remote assistance" provides explanation of the functions of the image forming apparatus 10.

In step 100 in FIG. 6, the display control section 30 causes the terminal apparatus 40 to display the second operation screen generated on the basis of the first operation screen of the image forming apparatus 10. That is, the first operation screen is displayed on the display section 16 of the image forming apparatus 10, and the second operation screen is displayed on the display section 42 of the terminal apparatus 40.

In step 102, it is determined whether the second mode, in which the terminal apparatus 40 performs remote control of the image forming apparatus 10, is selected by the selection section 32. The instruction for selecting the second mode may be given by the user of the image forming apparatus 10 or the operator of the terminal apparatus 40. If it is determined that the second mode is selected (positive determination), the process proceeds to step 104. If it is determined that the second mode is not selected, that is, the first mode is selected (negative determination), the process proceeds to step 116.

In step S104, the change control section 34 determines whether a certain operation has occurred in the image forming apparatus 10. If it is determined that a certain operation has occurred in the image forming apparatus 10 (positive determination), the process proceeds to step 106. If it is determined that a certain operation has not occurred in the image forming apparatus 10 (negative determination), the process waits at step 104.

In step 106, the change control section 34 determines whether the operation occurred in step 104 is an operation from the second operation screen. If it is determined that the operation occurred is an operation from the second operation screen (positive determination), the process proceeds to step 116. If it is determined that the operation occurred is not an operation from the second operation screen (negative operation), the process proceeds to step 108.

In step 108, the change control section 34 performs control in which information in accordance with the operation occurred is hidden from display. In this example, information in accordance with the operation occurred is displayed on neither of the first operation screen and the second operation screen.

In step 110, the change control section 34 determines whether an operation from the second operation screen is absent for a predetermined period or longer. If it is determined that an operation from the second operation screen is absent for the predetermined period or longer (positive determination), the process proceeds to step 112. If it is determined that an operation from the second operation screen is present within less than the predetermined period (negative determination), the process proceeds to step 116.

In step 112, the change control section 34 performs control in which the information that has been hidden from display in step 108 is displayed. In this example, the information that has been hidden from display is displayed on each of the first operation screen and the second operation screen.

In step 114, the change control section 34 determines whether the remote control using "remote assistance" is to end. If it is determined that the remote control is to end (positive determination), this process in accordance with the control program 14A ends. If it is determined that the remote control is not to end (negative determination), the process returns to step 102 to repeat the subsequent process.

On the other hand, in step 116, the change control section 34 performs control in which the display state is changed in accordance with the content of operation from the first operation screen or the second operation screen, and the process proceeds to step 114. In this example, the display state of each of the first operation screen and the second operation screen is changed in accordance with the content of operation from the first operation screen or the second operation screen.

Figure 7:
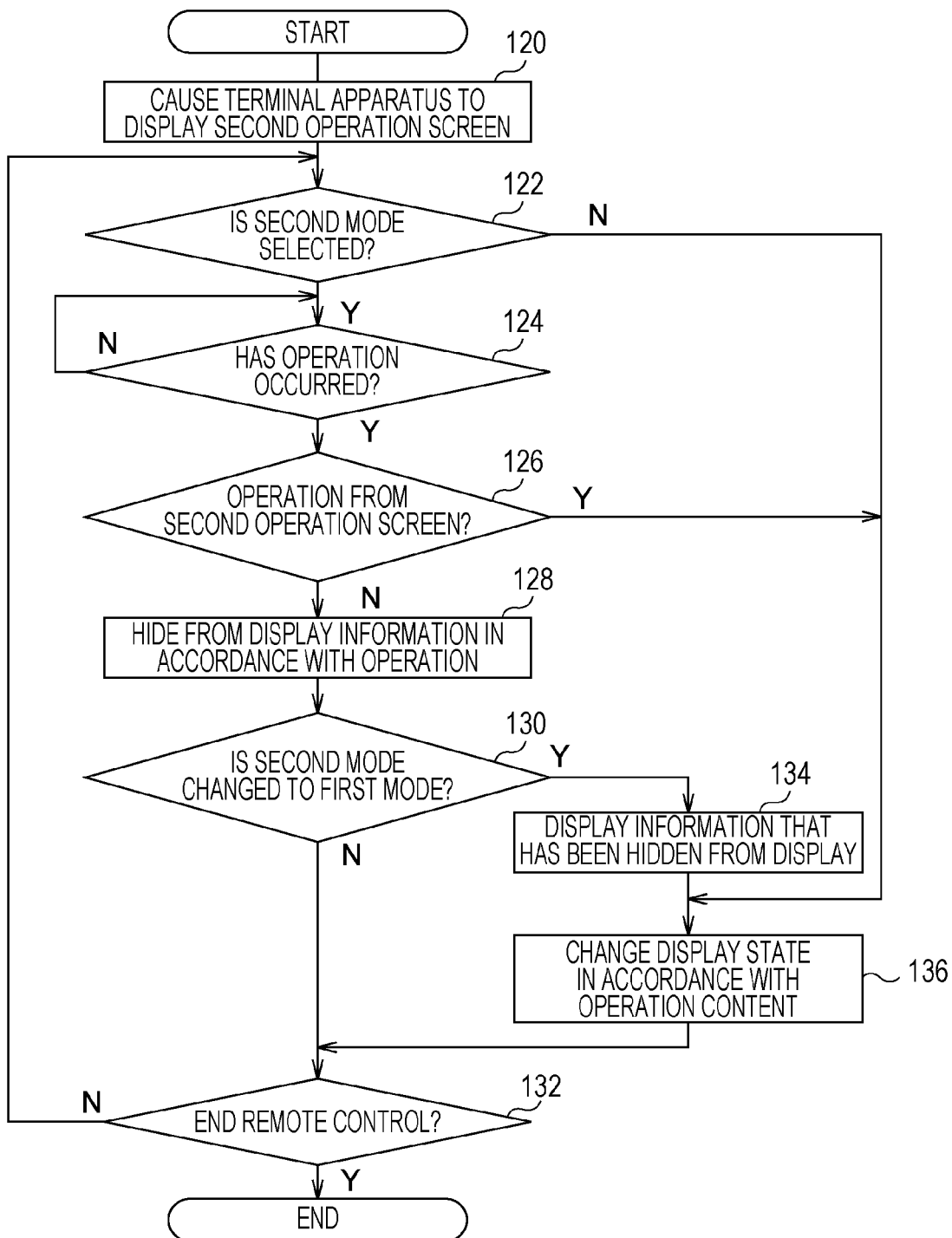
FIG. 7 is a flowchart illustrating another exemplary flow of a process in accordance with the control program according to the first exemplary embodiment.

FIG. 7 is a flowchart illustrating another exemplary flow of a process in accordance with the control program 14A according to the first exemplary embodiment.

In the exemplary flow illustrated in FIG. 7, the following case will be described: a case of performing control in which information that has been hidden from display is displayed if the second mode is changed to the first mode.

First, as in the exemplary flow illustrated in FIG. 6, in response to an instruction for executing "remote assistance" described above with reference to FIGS. 2 and 3, the control program 14A is started, and the following steps are performed. Note that steps 120 to 128 illustrated in FIG. 7 are the same as steps 100 to 108 illustrated in FIG. 6, respectively, and thus a repeated description thereof will be omitted.

In step 130 in FIG. 7, the change control section 34 determines whether the second mode is changed to the first mode. If it is determined that the second mode is not changed to the first mode (negative determination), the process proceeds to step 132. If it is determined that the second mode is changed to the first mode (positive determination), the process proceeds to step 134.

In step 132, the change control section 34 determines whether the remote control using "remote assistance" is to end. If it is determined that the remote control is to end (positive determination), this process in accordance with the control program 14A ends. If it is determined that the remote control is not to end (negative determination), the process returns to step 122 to repeat the subsequent process.

On the other hand, in step 134, the change control section 34 performs control in which the information that has been hidden from display in step 128 is displayed. In this example, the information that has been hidden from display is displayed on each of the first operation screen and the second operation screen.

In step 136, the change control section 34 performs control in which the display state is changed in accordance with the content of operation from the first operation screen or the second operation screen, and the process proceeds to step 132. In this example, the display state of each of the first operation screen and the second operation screen is changed in accordance with the content of operation from the first operation screen or the second operation screen.

Thus, according to this exemplary embodiment, if the second mode is selected, the display state of the second operation screen is prohibited from being changed in accordance with the operation occurred in the image forming apparatus 10 other than an operation from the second operation screen. Accordingly, in a case where the operator explains the operation method or the like by remote control, the explanation is not interrupted, and the operator does not have to start over the explanation. This reduces the troublesome feeling of the operator.

Second Exemplary Embodiment

A second exemplary embodiment will describe the following case. If the second mode is selected, information in accordance with an operation occurred in the image forming apparatus 10 other than an operation from the second operation screen is displayed in a non-operation area of the first operation screen.

The configuration of the image forming apparatus 10 according to this exemplary embodiment will be described with reference to the above-described configuration of the apparatus illustrated in FIG. 5.

If the second mode is selected by the selection section 32, the change control section 34 according to this exemplary embodiment performs control in which the display state of a specific area of the first operation screen is changed in accordance with the operation occurred in the image forming apparatus 10 other than an operation from the second operation screen. The specific area herein is, for example, a non-operation area 60 of the first operation screen illustrated in FIG. 9 described later. In this case, the change control section 34 performs control in which the information in accordance with the operation occurred in the image forming apparatus 10 other than an operation from the second operation screen (e.g., warning information 62 illustrated in FIG. 9) is displayed in the non-operation area. In addition, if a predetermined period or longer has elapsed from when the information in accordance with the operation occurred in the image forming apparatus 10 is displayed in the non-operation area, the change control section 34 may perform control in which the information is deleted from display.

Next, operations of the image forming apparatus 10 according to the second exemplary embodiment will be described with reference to FIGS. 8 and 9.

Figure 8:
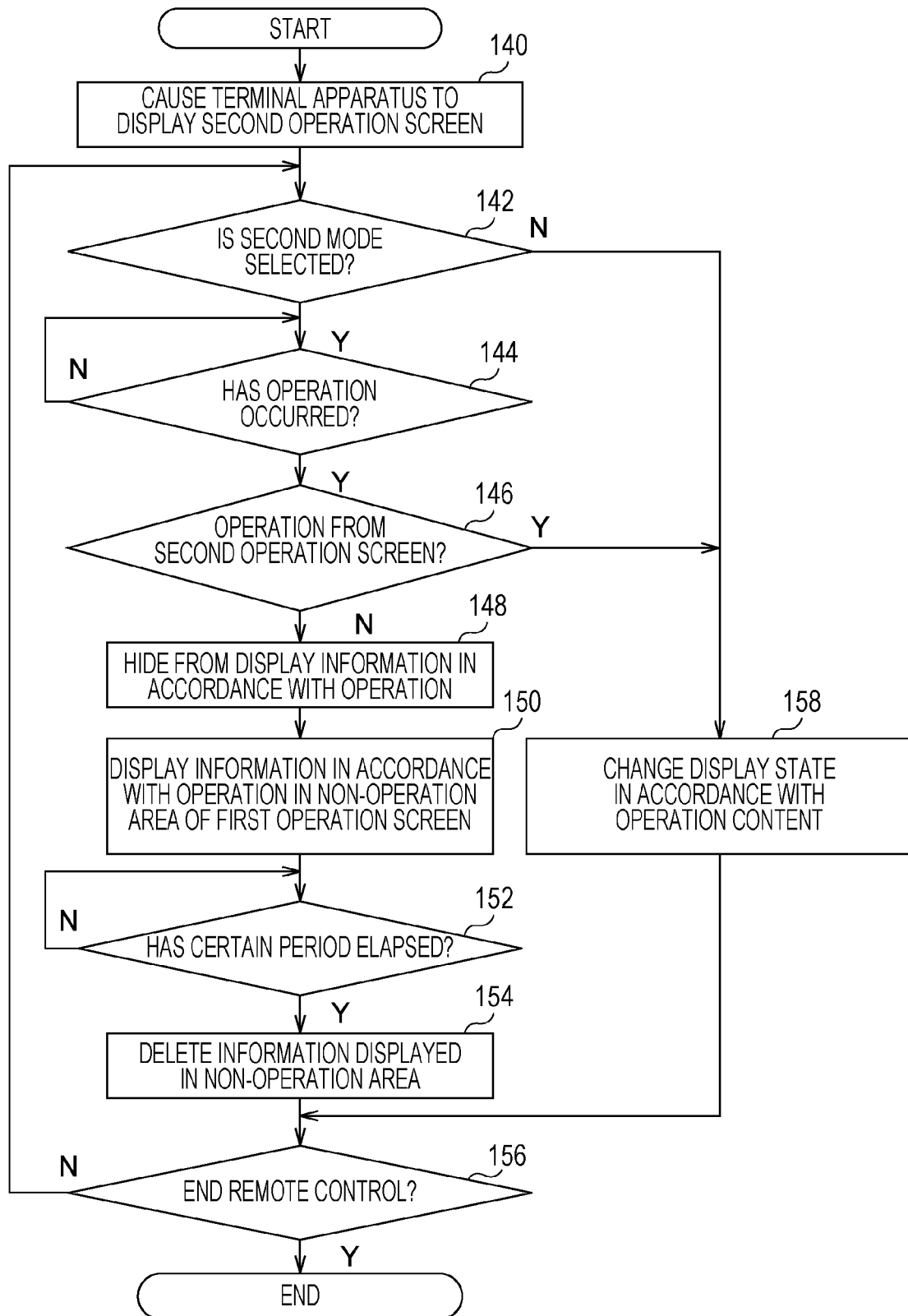
FIG. 8 is a flowchart illustrating exemplary flow of a process in accordance with a control program according to a second exemplary embodiment.

FIG. 8 is a flowchart illustrating exemplary flow of a process in accordance with the control program 14A according to the second exemplary embodiment.

Figure 9:
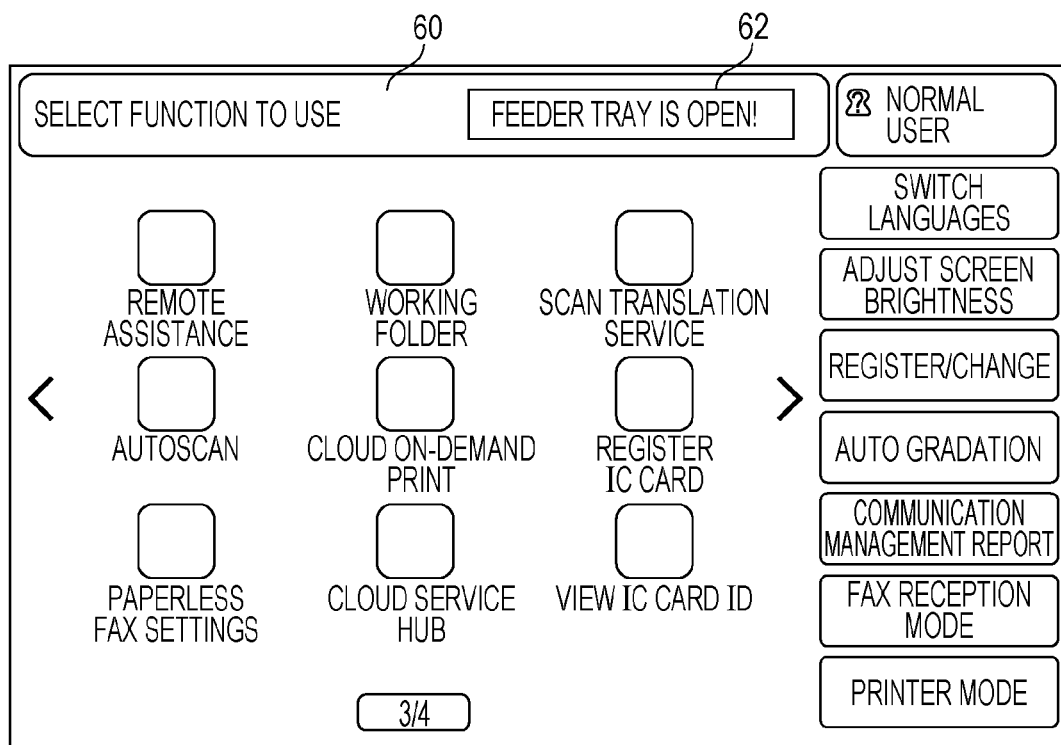
FIG. 9 is a front view of an exemplary home screen of an image forming apparatus according to the second exemplary embodiment.

FIG. 9 is a front view of an exemplary home screen of the image forming apparatus 10 according to the second exemplary embodiment.

First, as in the first exemplary embodiment, in response to an instruction for executing "remote assistance" described above with reference to FIGS. 2 and 3, the control program 14A is started, and the following steps are performed. Note that steps 140 to 148 illustrated in FIG. 8 are the same as steps 100 to 108 illustrated in FIG. 6, respectively, and thus a repeated description thereof will be omitted.

In step 150 in FIG. 8, the change control section 34 performs control in which information in accordance with the operation occurred in the image forming apparatus 10 is displayed in the non-operation area of the first operation screen. For example, as illustrated in FIG. 9, the warning information 62 in accordance with the operation occurred in the image forming apparatus 10 is displayed in the non-operation area 60 of the home screen, which is an example of the first operation screen. In this example, a warning message such as "FEEDER TRAY IS OPEN!" is displayed as an example of the warning information 62.

In step 152, the change control section 34 determines whether a predetermined period or longer has elapsed from when the information in accordance with the operation occurred in the image forming apparatus 10 is displayed in the non-operation area. If it is determined that the predetermined period or longer has elapsed (positive determination), the process proceeds to step 154. If it is determined that the predetermined period or longer has not elapsed (negative determination), the process waits at step 152.

In step 154, the change control section 34 performs control in which the information that has been displayed in the non-operation area in step 150 is deleted. For example, the warning information 62 illustrated in FIG. 9 is deleted.

In step 156, the change control section 34 determines whether the remote control using "remote assistance" is to end. If it is determined that the remote control is to end (positive determination), this process in accordance with the control program 14A ends. If it is determined that the remote control is not to end (negative determination), the process returns to step 142 to repeat the subsequent process.

On the other hand, in step 158, the change control section 34 performs control in which the display state is changed in accordance with the content of operation from the first operation screen or the second operation screen, and the process proceeds to step 156. In this example, the display state of each of the first operation screen and the second operation screen is changed in accordance with the content of operation from the first operation screen or the second operation screen.

In the above manner, according to this exemplary embodiment, if the second mode is selected, the information in accordance with the operation occurred in the image forming apparatus 10 other than an operation from the second operation screen is displayed in the non-operation area of the first operation screen. Accordingly, at least the user of the image forming apparatus 10 is able to understand the operation state of the image forming apparatus 10.

Third Exemplary Embodiment

A third exemplary embodiment will describe the following case. If the second mode is selected and no operation from the second operation screen is received for a predetermined period or longer, automatic reset of the image forming apparatus 10 is prohibited.

The configuration of the image forming apparatus 10 according to this exemplary embodiment will be described with reference to the above-described configuration of the apparatus illustrated in FIG. 5.

In the related art, if the second mode is selected and no operation from the second operation screen is received for a predetermined period or longer, automatic reset of the image forming apparatus 10 may be performed. In this case, the automatic reset may cancel user authentication so that any operation from the operator may undesirably become unacceptable.

In contrast, if the second mode is selected by the selection section 32 and no operation from the second operation screen is received for a predetermined period or longer, the change control section 34 according to this exemplary embodiment performs control in which automatic reset of the image forming apparatus 10 is prohibited. In this case, if the second mode is changed to the first mode by the selection section 32, the change control section 34 may performs control in which the automatic reset of the image forming apparatus 10 is allowed.

Next, operations of the image forming apparatus 10 according to the third exemplary embodiment will be described with reference to FIG. 10.

Figure 10:
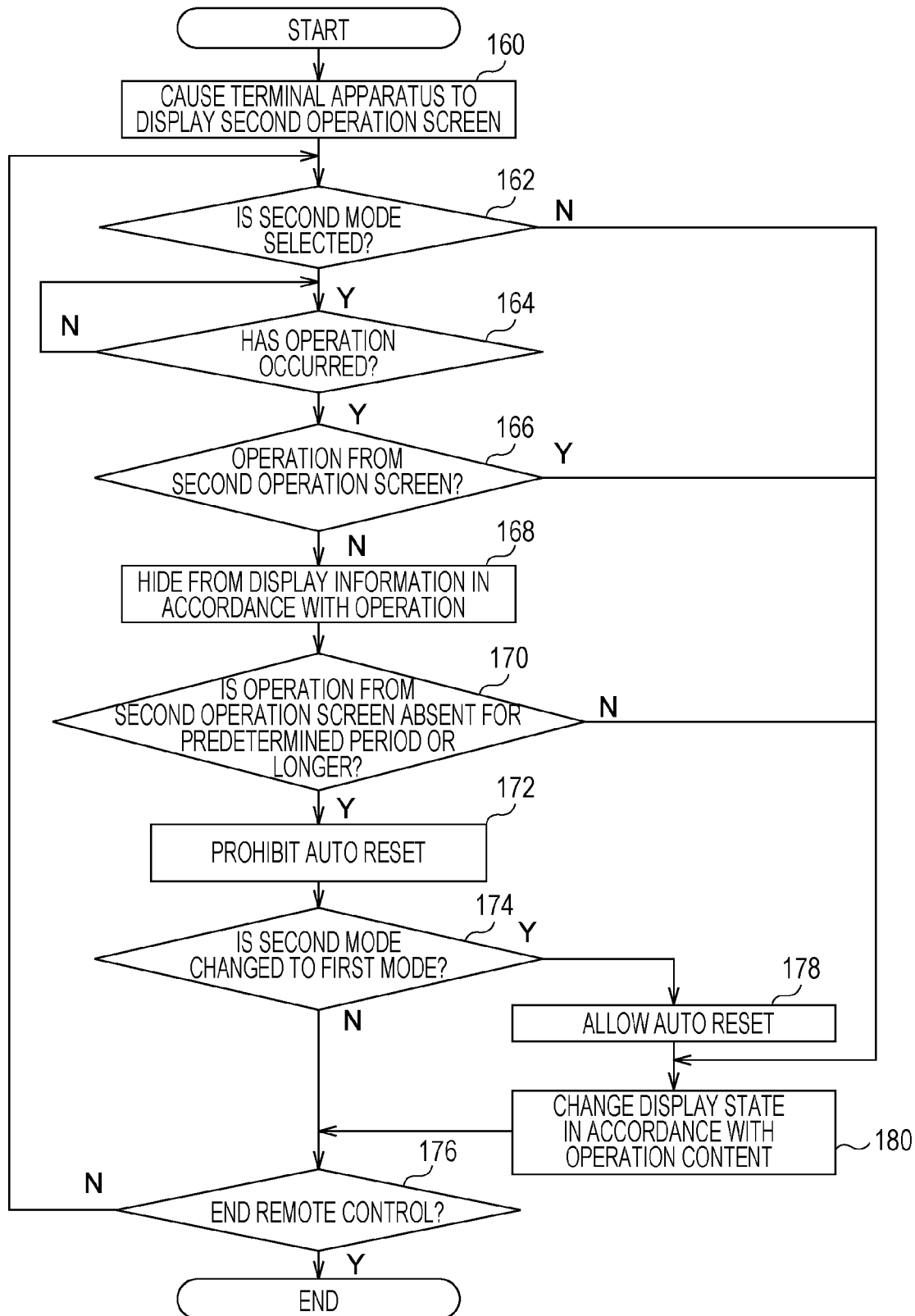
FIG. 10 is a flowchart illustrating exemplary flow of a process in accordance with a control program according to a third exemplary embodiment.

FIG. 10 is a flowchart illustrating exemplary flow of a process in accordance with the control program 14A according to the third exemplary embodiment.

First, as in the first exemplary embodiment, in response to an instruction for executing "remote assistance" described above with reference to FIGS. 2 and 3, the control program 14A is started, and the following steps are performed. Note that steps 160 to 170 illustrated in FIG. 10 are the same as steps 100 to 110 illustrated in FIG. 6, respectively, and thus a repeated description thereof will be omitted.

In step 172 in FIG. 10, if the second mode is selected and no operation from the second operation screen is received for a predetermined period or longer, the change control section 34 performs control in which automatic reset of the image forming apparatus 10 is prohibited.

In step 174, the change control section 34 determines whether the second mode is changed to the first mode. If it is determined that the second mode is not changed to the first mode (negative determination), the process proceeds to step 176. If it is determined that the second mode is changed to the first mode (positive determination), the process proceeds to step 178.

In step 176, the change control section 34 determines whether the remote control using "remote assistance" is to end. If it is determined that the remote control is to end (positive determination), this process in accordance with the control program 14A ends. If it is determined that the remote control is not to end (negative determination), the process returns to step 162 to repeat the subsequent process.

On the other hand, in step S178, the change control section 34 performs control in which the automatic reset of the image forming apparatus 10, which has been prohibited in step 172, is allowed.

In step 180, the change control section 34 performs control in which the display state is changed in accordance with the content of operation from the first operation screen or the second operation screen, and the process proceeds to step 176. In this example, the display state of each of the first operation screen and the second operation screen is changed in accordance with the content of operation from the first operation screen or the second operation screen.

In the above manner, according to this exemplary embodiment, if the second mode is selected and no operation from the second operation screen is received for a predetermined period or longer, the automatic reset of the image forming apparatus 10 is prohibited. Accordingly, the automatic reset does not cancel user authentication, thereby preventing a situation where any operation from the operator becomes unacceptable.

Fourth Exemplary Embodiment

A fourth exemplary embodiment will describe the following case. Even if no operation from the second operation screen is received for a predetermined period or longer in a state where a user is authenticated, user authentication is not canceled.

The configuration of the image forming apparatus 10 according to this exemplary embodiment will be described with reference to the above-described configuration of the apparatus illustrated in FIG. 5.

In the related art, if a user is authenticated, the second mode is selected, and no operation from the second operation screen is received for a predetermined period or longer, user authentication may be canceled. In this case, as in the third exemplary embodiment, any operation from the operator may undesirably become unacceptable.

In contrast, even if the user is authenticated, the second mode is selected by the selection section 32, and no operation from the second operation screen is received for a predetermined period or longer, the authentication section 36 according to this exemplary embodiment does not cancel the user authentication. Note that, if the user is authenticated, the first mode is selected by the selection section 32, and no operation from the first operation screen is received for a predetermined period or longer, the authentication section 36 cancels the user authentication.

Next, operations of the image forming apparatus 10 according to the fourth exemplary embodiment will be described with reference to FIG. 11.

Figure 11:
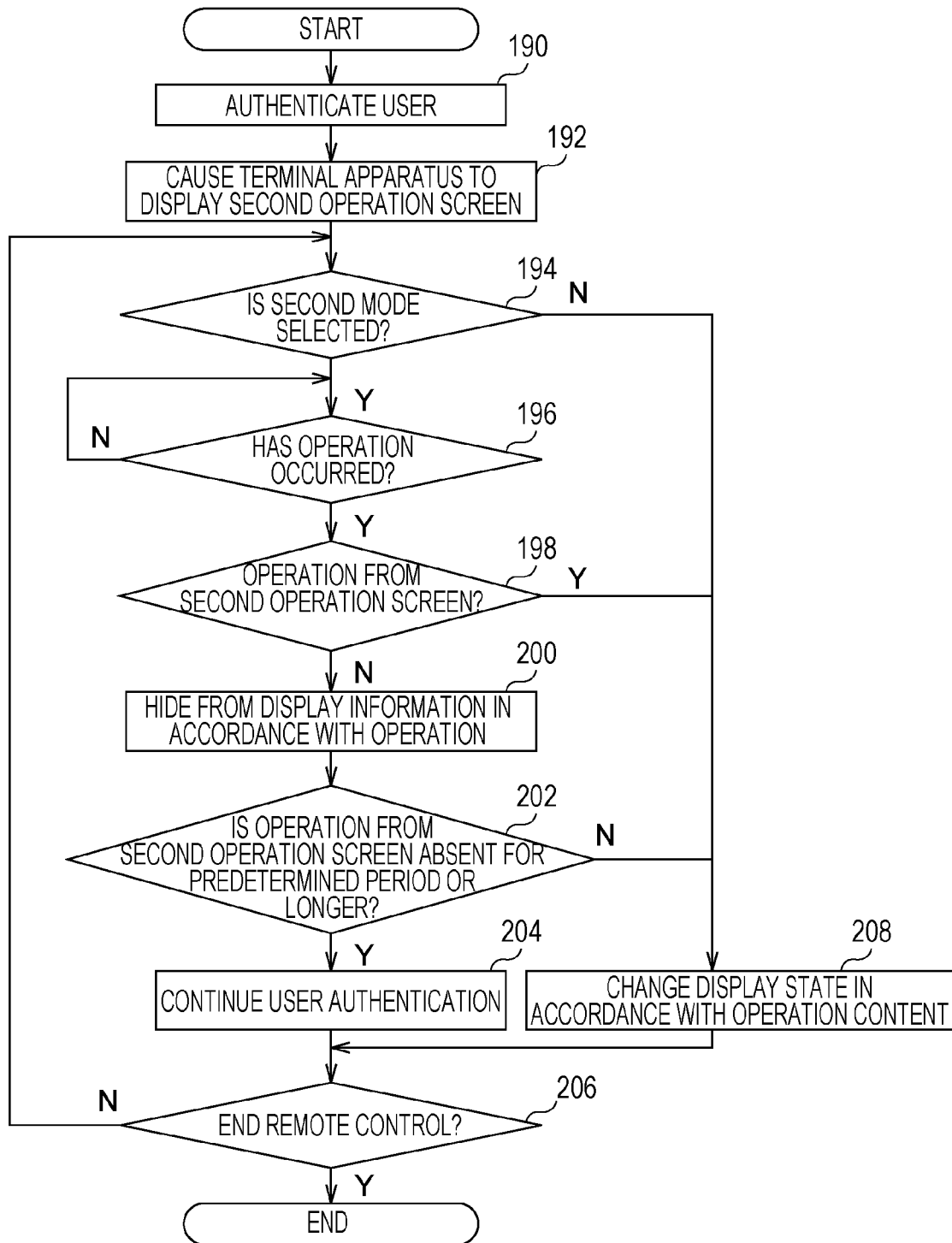
FIG. 11 is a flowchart illustrating exemplary flow of a process in accordance with a control program according to a fourth exemplary embodiment.

FIG. 11 is a flowchart illustrating exemplary flow of a process in accordance with the control program 14A according to the fourth exemplary embodiment.

First, as in the first exemplary embodiment, in response to an instruction for executing "remote assistance" described above with reference to FIGS. 2 and 3, the control program 14A is started, and the following steps are performed. Note that steps 192 to 202 illustrated in FIG. 11 are the same as steps 100 to 110 illustrated in FIG. 6, respectively, and thus a repeated description thereof will be omitted.

In step 190 in FIG. 11, the authentication section 36 authenticates a user of the image forming apparatus 10 on the basis of a user ID and a password that are input through an authentication screen of the image forming apparatus 10.

In step 204, if the user is authenticated, the second mode is selected, and no operation from the second operation screen is received for a predetermined period or longer, the authentication section 36 does not cancel the user authentication and continues the user authentication.

In step 206, the change control section 34 determines whether the remote control using "remote assistance" is to end. If it is determined that the remote control is to end (positive determination), this process in accordance with the control program 14A ends. If it is determined that the remote control is not to end (negative determination), the process returns to step 194 to repeat the subsequent process.

On the other hand, in step 208, the change control section 34 performs control in which the display state is changed in accordance with the content of operation from the first operation screen or the second operation screen, and the process proceeds to step 206. In this example, the display state of each of the first operation screen and the second operation screen is changed in accordance with the content of operation from the first operation screen or the second operation screen.

In the above manner, according to this exemplary embodiment, even if the user is authenticated, the second mode is selected, and no operation from the second operation screen is received for a predetermined period or longer, the user authentication is not canceled. This prevents a situation where any operation from the operator becomes unacceptable.

The exemplary image forming apparatus according to the exemplary embodiments has been described above. In some exemplary embodiments, it is also possible to provide a program for causing a computer to execute the functions of the sections included in the image forming apparatus. In some exemplary embodiments, it is also possible to provide a computer readable medium storing the program.

The configuration of the image forming apparatus described in the above exemplary embodiments is an example and may be modified in accordance with a situation without departing from the spirit of the present disclosure.

In addition, the process flows of programs described in the above exemplary embodiments are also examples, and unnecessary steps may be skipped, new steps may be added, or the processing order may be changed, without departing from the spirit of the present disclosure.

Furthermore, the above exemplary embodiments have described cases where programs are executed to perform the processes according to the exemplary embodiments with a software configuration using a computer. However, the present disclosure is not limited to these exemplary embodiments, and the exemplary embodiments may be implemented by, for example, a hardware configuration or combination of a hardware configuration and a software configuration.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling other's skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor, configured to perform control in which a second operation screen is displayed on a terminal apparatus that is connected to the information processing apparatus in a manner communication is possible, the second operation screen being generated on the basis of a first operation screen of the information processing apparatus;
wherein the processor is further configured to select either one of a first mode and a second mode, the first mode being a mode in which an operation from the first operation screen is acceptable, the second mode being a mode in which remote control from the second operation screen is acceptable; and
wherein the processor is further configured to perform control in which, if the second mode is selected by the processor, a display state of the second operation screen is prohibited from being changed in accordance with an operation occurred in the information processing apparatus other than an operation from the second operation screen,
wherein, if the second mode is selected by the processor, the processor further performs control in which a display state of a specific area of the first operation screen is changed in accordance with the operation occurred in the information processing apparatus other than an operation from the second operation screen.

2. The information processing apparatus according to claim 1,
wherein, if the second mode is selected by the processor, the processor further performs control in which a display state of the first operation screen is prohibited from being changed in accordance with the operation occurred in the information processing apparatus other than an operation from the second operation screen.

3. The information processing apparatus according to claim 1,
wherein, if the second mode is selected by the processor, the processor further performs control in which information in accordance with the operation occurred in the information processing apparatus other than an operation from the second operation screen is hidden from display.

4. The information processing apparatus according to claim 2,
wherein, if the second mode is selected by the processor, the processor further performs control in which information in accordance with the operation occurred in the information processing apparatus other than an operation from the second operation screen is hidden from display.

5. The information processing apparatus according to claim 3,
wherein, if the second mode is selected by the processor and no operation from the second operation screen is received for a predetermined period or longer, the processor further performs control in which the information that has been hidden from display is displayed.

6. The information processing apparatus according to claim 4,
wherein, if the second mode is selected by the processor and no operation from the second operation screen is received for a predetermined period or longer, the processor further performs control in which the information that has been hidden from display is displayed.

7. The information processing apparatus according to claim 3,
wherein, if the second mode is changed to the first mode by the processor, the processor further performs control in which the information that has been hidden from display is displayed.

8. The information processing apparatus according to claim 4,
wherein, if the second mode is changed to the first mode by the processor, the processor further performs control in which the information that has been hidden from display is displayed.

9. The information processing apparatus according to claim 1,
wherein the specific area is a non-operation area of the first operation screen, and
wherein the processor further performs control in which information in accordance with the operation occurred in the information processing apparatus other than an operation from the second operation screen is displayed in the non-operation area.

10. The information processing apparatus according to claim 9,
wherein, if a predetermined period or longer has elapsed from when the information is displayed in the non-operation area, the processor further performs control in which the information is deleted from display.

11. The information processing apparatus according to claim 1,
wherein, if the second mode is selected by the processor and no operation from the second operation screen is received for a predetermined period or longer, the processor further performs control in which automatic reset of the information processing apparatus is prohibited.

12. The information processing apparatus according to claim 1,
wherein, if the second mode is changed to the first mode by the processor, the processor further performs control in which the automatic reset of the information processing apparatus is allowed.

13. The information processing apparatus according to claim 1, further comprising:
an authentication section that authenticates a user of the information processing apparatus,
wherein, even if the user is authenticated, the second mode is selected by the processor, and no operation from the second operation screen is received for a predetermined period or longer, the authentication section does not cancel authentication of the user.

14. A non-transitory computer readable medium storing a program causing a computer to serve as the processor included in the information processing apparatus according to claim 1.

15. An information processing apparatus comprising:
a processor, configured to perform control in which a second operation screen is displayed on a terminal apparatus that is connected to the information processing apparatus in a manner communication is possible, the second operation screen being generated on the basis of a first operation screen of the information processing apparatus;
wherein the processor is further configured to select either one of a first mode and a second mode, the first mode being a mode in which an operation from the first operation screen is acceptable, the second mode being a mode in which remote control from the second operation screen is acceptable; and
wherein the processor is further configured to perform control in which, if the second mode is selected by the processor, a display state of the second operation screen is prohibited from being changed in accordance with an operation occurred in the information processing apparatus other than an operation from the second operation screen,
wherein, if the second mode is selected by the processor and no operation from the second operation screen is received for a predetermined period or longer, the processor further performs control in which automatic reset of the information processing apparatus is prohibited.

16. The information processing apparatus according to claim 15,
wherein, if the second mode is selected by the processor, the processor further performs control in which information in accordance with the operation occurred in the information processing apparatus other than an operation from the second operation screen is hidden from display.

17. An information processing apparatus comprising:
a processor, configured to perform control in which a second operation screen is displayed on a terminal apparatus that is connected to the information processing apparatus in a manner communication is possible, the second operation screen being generated on the basis of a first operation screen of the information processing apparatus;

wherein the processor is further configured to select either one of a first mode and a second mode, the first mode being a mode in which an operation from the first operation screen is acceptable, the second mode being a mode in which remote control from the second operation screen is acceptable; and wherein the processor is further configured to perform control in which, if the second mode is selected by the processor, a display state of the second operation screen is prohibited from being changed in accordance with an operation occurred in the information processing apparatus other than an operation from the second operation screen, wherein, if the second mode is changed to the first mode by the processor, the processor further performs control in which the automatic reset of the information processing apparatus is allowed.

* * * * *